US012254023B2

(12) United States Patent
Khani et al.

(10) Patent No.: US 12,254,023 B2
(45) Date of Patent: Mar. 18, 2025

(54) POWER SYSTEM MODEL CONVERSION

(71) Applicant: Quanta Technology, LLC, Raleigh, NC (US)

(72) Inventors: Hadi Khani, Richmond Hill (CA); David G. Hart, Raleigh, NC (US)

(73) Assignee: Quanta Technology, LLC, Raleigh, NC (US)

( * ) Notice: Subject to any disclaimer, the term of this patent is extended or adjusted under 35 U.S.C. 154(b) by 134 days.

(21) Appl. No.: 18/125,815

(22) Filed: Mar. 24, 2023

(65) Prior Publication Data
US 2024/0320236 A1    Sep. 26, 2024

(51) Int. Cl.
*G06F 16/25* (2019.01)
*G06F 16/215* (2019.01)

(52) U.S. Cl.
CPC .......... *G06F 16/258* (2019.01); *G06F 16/215* (2019.01)

(58) Field of Classification Search
CPC .... G06F 16/258; G06F 16/215; G06F 21/554; G06F 11/0736; G06F 11/0751; G06F 11/0769; G06F 11/0772; G06F 11/0793; G06F 11/1004; G06F 11/1417; G06F 11/1433; G06F 11/1441; G06F 11/1448; G06F 16/972; G06F 30/27; G06F 8/65; G06F 8/654; G06F 8/71; G06F 9/4401; G06F 9/4406; G01R 15/00; G01R 15/06; G01R 15/16; G01R 19/10; G01R 22/063; G01R 29/18; G01R 31/00; G01R 35/00; G06N 20/00; G06N 3/045; G06N 3/08
See application file for complete search history.

(56) References Cited

U.S. PATENT DOCUMENTS

| | | | |
|---|---|---|---|
| 2010/0169030 A1* | 7/2010 | Parlos .................. | G01R 31/343 702/58 |
| 2016/0154041 A1* | 6/2016 | Bi .......................... | G01R 19/00 702/66 |
| 2019/0245349 A1* | 8/2019 | Madani ................... | H02J 3/242 |

OTHER PUBLICATIONS

Alican, Onur , "Power Systems Phasor and EMT Modelling and Automatic Simulation Across Multiple Software", Master Thesis, Universitat Politécnica de Catalunya, Jun. 29, 2022, 1-105.

(Continued)

*Primary Examiner* — Alvaro E Fortich
(74) *Attorney, Agent, or Firm* — Murphy, Bilak & Homiller, PLLC

(57) ABSTRACT

Equipment is provided for converting a phasor-domain model of a power system to a time-domain model. The equipment obtains the phasor-domain model and a raw file that represents a representable subset of parameters of the phasor-domain model. The equipment modifies the raw file as needed for the raw file to accurately represent the representable subset of parameters. The equipment generates a supplementary file that represents a non-representable subset of parameters of the phasor-domain model which is not representable by the raw file. The equipment also obtains a time-domain specific parameter file that represents parameters specific for modeling the power system in the time-domain. The equipment converts the phasor-domain model to the time-domain model, based on the raw file as modified, the supplementary file, and the time-domain specific parameter file. The equipment may also perform fault simulation-based quality verification of the time-domain model.

21 Claims, 6 Drawing Sheets

(56) References Cited

OTHER PUBLICATIONS

Author Unknown, "4.1 Activity Read", Load Flow Activity Descriptors, Program Operation Manual vol. 1 PSS/E-30.1, Siemens Power Transmission & Distribution, Inc., 2013, 35 pages.
Author Unknown, "LAB1—Introduction to PSS/E", EE 461 Power Systems, <https://www.engr.colostate.edu/ECE461/labs/lab1_PSSEIntroduction.pdf> Colorado State University, accessed Jan. 20, 2023, 1-16.
Mones, Letif, "A Gentle Introduction to Power Flow", Invenia Blog, <https://invenia.github.io/blog/2020/12/04/pf-intro/>, 1-13, Dec. 4, 2020.
Murad, Mohammed Ahsan Adib, "Phasor Time-Domain Power System Modeling and Simulation using the Standardized Modelica Language: Conventional and Power Electronic-Based Devices", Degree Project, In Smart Electrical Networks and Systems, Second Level, Stockholm, Sweden, 2015, 1-89.
Weber, James, "PowerWorld's Experience Using Real-Time Power System Models", Node-Breaker Modeling Representation Webinar, North America Electric Reliability Corporation, Champaign, Illinois, Dec. 6, 2016, 1-195.
Zelaya, Marcos Alexander Ayala, "Steady-State Analysis in Transmission System Planning per Latest TPL-001-4 NERC Standard", Master of Science in Electrical Engineering, Blacksburg, Virginia, Dec. 9, 2015, 1-140.

* cited by examiner

POWER SYSTEM MODEL CONVERSION

TECHNICAL FIELD

The present application relates generally to a power system, and relates more particularly to conversion of a model of a power system.

BACKGROUND

A power system is a system of electrical components deployed to generate, transmit, and/or distribute electric power. Designers and/or operators of a power system often analyze the behavior of the power system as part of designing and/or configuring the power system. Such analysis may for example evaluate how the power system responds to potential load variations, equipment outages, transmission line losses, and other possible contingencies that could affect the ability of the power system to operate normally.

Model-based analysis requires a model of the power system, e.g., that models the power system topology, the power system connectivity, and/or the electrical characteristics of power system equipment. Analysis may involve solving for the currents, voltages, and/or power flows that would exist in the power system as modeled under different scenarios. Analyzing a multitude of scenarios can demand meaningful computational resources and/or time, especially when the analysis is conducted for several operating states and loading levels and/or when a complete alternating current (AC) power flow is required for each scenario.

Modeling the power system in the phasor-domain proves advantageous for decreasing the computational effort and time of some types of analysis, as compared to modeling the power system in the time-domain. Indeed, phasor-domain modeling simplifies calculations by ignoring electromagnetic transients, assuming a constant system frequency, and using phasor vales of electrical components. This simplification yields dividends especially for analyzing large-scale power systems.

Phasor-domain modeling, however, jeopardizes accuracy under some circumstances. For example, while phasor-domain modeling provides sufficient accuracy in most cases, phasor-domain modeling threatens to reduce accuracy below acceptable levels when the power system includes a meaningful number of inverter-based distributed energy resources (DERs). With the number of inverter-based DERs trending upward, so too is the need for performing power system analysis on time-domain models.

SUMMARY

Some embodiments herein convert a phasor-domain model of a power system to a corresponding time-domain model of the power system. Some embodiments integrate quality verification checks into the conversion process, at multiple points in the conversion process, for making intermediate conversion adjustments as needed to increase conversion accuracy. One or more embodiments, for example, make conversion adjustments using the results of fault simulation-based quality verification, to reduce discrepancy between the time-domain model and the phasor-domain model in terms of the power system's response to faults. These and other embodiments thereby advantageously provide accurate conversion of a phasor-domain model of a power system to a corresponding time-domain model. This in turn facilitates power system analysis, even for power systems that include a meaningful number of inverter-based DERs, without requiring designers and/or operators to develop the time-domain model from scratch and/or without jeopardizing the accuracy gains realizable from time-domain modeling.

More particularly, embodiments herein include a method for power system model conversion and quality verification. The method comprises obtaining a phasor-domain model of a power system. The method also comprises obtaining a raw file that represents a representable subset of parameters of the phasor-domain model as parameters of a bus-branch model. The method also comprises modifying values of the parameters of the bus-branch model in the raw file as needed for the raw file as modified to represent the representable subset of parameters of the phasor-domain model with at least a minimum level of accuracy. The method also comprises generating, from the phasor-domain model, a supplementary file that represents a non-representable subset of parameters of the phasor-domain model which is not representable by the raw file. The method also comprises obtaining a time-domain specific parameter file that represents parameters specific for modeling the power system in a time-domain. The method also comprises converting the phasor-domain model of the power system to a time-domain model of the power system, based on the raw file as modified, the supplementary file, and the time-domain specific parameter file. The method also comprises performing fault simulation-based quality verification of the time-domain model by comparing results of fault simulation in the power system as modeled with the phasor-domain model and results of fault simulation in the power system as modeled with the time-domain model.

In some embodiments, said modifying comprises, for each of one or more iterations, extracting, from the phasor-domain model, values of at least some parameters in the representable subset. In some embodiments, said modifying comprises, for each of one or more iterations, performing a comparison of the extracted values with values of respective parameters in the bus-branch model in the raw file. In some embodiments, said modifying comprises, for each of one or more iterations, modifying one or more values of the respective parameters in the bus-branch model in the raw file, as needed to reduce any discrepancy with the extracted parameters according to the comparison. In some embodiments, said extracting and/or said modifying is performed by running rule-based Structured Query Language (SQL) queries on the phasor-domain model.

In some embodiments, performing fault simulation-based quality verification of the time-domain model comprises performing one or more phasor-domain simulations of faults in the power system as modeled with the phasor-domain model and obtaining phasor-domain results of the one or more phasor-domain simulations. In some embodiments, performing fault simulation-based quality verification of the time-domain model comprises performing one or more time-domain simulations of faults in the power system as modeled with the time-domain model and obtaining time-domain results of the one or more time-domain simulations. In some embodiments, performing fault simulation-based quality verification of the time-domain model comprises converting the time-domain results into the phasor-domain, or converting the phasor-domain results into the time-domain, to obtain results of the one or more phasor-domain simulations and results of the one or more time-domain simulations in a common domain. In some embodiments, performing fault simulation-based quality verification of the time-domain model comprises comparing results of the one or more phasor-domain simulations and results of the one or more time-domain simulations in the common domain.

In some embodiments, performing the fault simulation-based quality verification of the time-domain model comprises performing the fault simulation-based quality verification of the time-domain model in each of multiple iterations, modifying the time-domain model in between the iterations as needed to reduce discrepancy between the results of fault simulation in the power system as modeled with the phasor-domain model and results of fault simulation in the power system as modeled with the time-domain model.

In some embodiments, the method further comprises performing data-based quality verification of the time-domain model by extracting data of the same type from each of the time-domain model and the phasor-domain model. In some embodiments, the method further comprises performing data-based quality verification of the time-domain model by comparing the data extracted from the time-domain model to the data extracted from the phasor-domain model. In some embodiments, the extracted data includes at least line parameters including zero, positive, and/or negative sequence values. In other embodiments, the extracted data includes at least generator parameters including zero, positive, and/or negative sequence values, ratings, and/or voltage levels. In yet other embodiments, the extracted data includes at least shunt equipment parameters including zero, positive, and/or negative sequence values. In some embodiments, performing the data-based quality verification of the time-domain model comprises performing the data-based quality verification of the time-domain model in each of multiple iterations, modifying the time-domain model in between the iterations as needed to reduce discrepancy between the data extracted from the time-domain model and the data extracted from the phasor-domain model.

In some embodiments, the parameters of the bus-branch model include a bus voltage parameter indicating voltage levels of respective buses in the bus-branch model. In some embodiments, parameters specific for modeling the power system in a time-domain include transformer saturation parameters, transient parameters, and/or frequency-dependent line parameters, and the non-representable subset of parameters includes a mutual coupling parameter.

Other embodiments herein include a non-transitory computer-readable medium on which is stored a computer program that, when executed by processing circuitry of a computer, causes the computer to obtain a phasor-domain model of a power system. In some embodiments, the computer program also causes the computer to obtain a raw file that represents a representable subset of parameters of the phasor-domain model as parameters of a bus-branch model. In some embodiments, the computer program also causes the computer to modify values of the parameters of the bus-branch model in the raw file as needed for the raw file as modified to represent the representable subset of parameters of the phasor-domain model with at least a minimum level of accuracy. In some embodiments, the computer program also causes the computer to generate, from the phasor-domain model, a supplementary file that represents a non-representable subset of parameters of the phasor-domain model which is not representable by the raw file. In some embodiments, the computer program also causes the computer to obtain a time-domain specific parameter file that represents parameters specific for modeling the power system in a time-domain. In some embodiments, the computer program also causes the computer to convert the phasor-domain model of the power system to a time-domain model of the power system, based on the raw file as modified, the supplementary file, and the time-domain specific parameter file. In some embodiments, the computer program also causes the computer to perform fault simulation-based quality verification of the time-domain model by comparing results of fault simulation in the power system as modeled with the phasor-domain model and results of fault simulation in the power system as modeled with the time-domain model.

In some embodiments, the computer program, when executed by the processing circuitry of the computer, causes the computer to modify values of the parameters of the bus-branch model in the raw file for each of one or more iterations. In some embodiments, the computer modifies values by extracting, from the phasor-domain model, values of at least some parameters in the representable subset. In some embodiments, the computer modifies values by performing a comparison of the extracted values with values of respective parameters in the bus-branch model in the raw file. In some embodiments, the computer modifies values by modifying one or more values of the respective parameters in the bus-branch model in the raw file, as needed to reduce any discrepancy with the extracted parameters according to the comparison. In some embodiments, the computer program, when executed by the processing circuitry of the computer, causes the computer to perform said extracting and/or said modifying by running rule-based Structured Query Language (SQL) queries on the phasor-domain model.

In some embodiments, the computer program, when executed by the processing circuitry of the computer, causes the computer to perform fault simulation-based quality verification of the time-domain model. In some embodiments, the computer performs fault simulation-based quality verification by performing one or more phasor-domain simulations of faults in the power system as modeled with the phasor-domain model and obtaining phasor-domain results of the one or more phasor-domain simulations. In some embodiments, the computer performs fault simulation-based quality verification by performing one or more time-domain simulations of faults in the power system as modeled with the time-domain model and obtaining time-domain results of the one or more time-domain simulations. In some embodiments, the computer performs fault simulation-based quality verification by converting the time-domain results into the phasor-domain, or converting the phasor-domain results into the time-domain, to obtain results of the one or more phasor-domain simulations and results of the one or more time-domain simulations in a common domain. In some embodiments, the computer performs fault simulation-based quality verification by comparing results of the one or more phasor-domain simulations and results of the one or more time-domain simulations in the common domain.

In some embodiments, the computer program, when executed by the processing circuitry of the computer, causes the computer to perform the fault simulation-based quality verification of the time-domain model by performing the fault simulation-based quality verification of the time-domain model in each of multiple iterations, modifying the time-domain model in between the iterations as needed to reduce discrepancy between the results of fault simulation in the power system as modeled with the phasor-domain model and results of fault simulation in the power system as modeled with the time-domain model.

In some embodiments, the computer program, when executed by the processing circuitry of the computer, further causes the computer to perform data-based quality verification of the time-domain model. In some embodiments, the computer program performs data-based quality verification by extracting data of the same type from each of the time-domain model and the phasor-domain model. In some embodiments, the computer program performs data-based quality verification by comparing the data extracted from the time-domain model to the data extracted from the phasor-domain model. In some embodiments, the extracted data includes at least line parameters including zero, positive, and/or negative sequence values. In other embodiments, the extracted data includes at least generator parameters including zero, positive, and/or negative sequence values, ratings, and/or voltage levels. In yet other embodiments, the extracted data includes at least shunt equipment parameters including zero, positive, and/or negative sequence values. In some embodiments, the computer program, when executed by the processing circuitry of the computer, causes the computer to perform the data-based quality verification of the time-domain model by performing the data-based quality verification of the time-domain model in each of multiple iterations, modifying the time-domain model in between the iterations as needed to reduce discrepancy between the data extracted from the time-domain model and the data extracted from the phasor-domain model.

In some embodiments, the parameters of the bus-branch model include a bus voltage parameter indicating voltage levels of respective buses in the bus-branch model. In some embodiments, parameters specific for modeling the power system in a time-domain include transformer saturation parameters, transient parameters, and/or frequency-dependent line parameters, and the non-representable subset of parameters includes a mutual coupling parameter.

Other embodiments herein include conversion equipment comprising processing circuitry. The processing circuitry is configured to obtain a phasor-domain model of a power system. The processing circuitry is also configured to obtain a raw file that represents a representable subset of parameters of the phasor-domain model as parameters of a bus-branch model. The processing circuitry is also configured to modify values of the parameters of the bus-branch model in the raw file as needed for the raw file as modified to represent the representable subset of parameters of the phasor-domain model with at least a minimum level of accuracy. The processing circuitry is also configured to generate, from the phasor-domain model, a supplementary file that represents a non-representable subset of parameters of the phasor-domain model which is not representable by the raw file. The processing circuitry is also configured to obtain a time-domain specific parameter file that represents parameters specific for modeling the power system in a time-domain. The processing circuitry is also configured to convert the phasor-domain model of the power system to a time-domain model of the power system, based on the raw file as modified, the supplementary file, and the time-domain specific parameter file. The processing circuitry is also configured to perform fault simulation-based quality verification of the time-domain model by comparing results of fault simulation in the power system as modeled with the phasor-domain model and results of fault simulation in the power system as modeled with the time-domain model.

Of course, the present disclosure is not limited to the above features and advantages. Indeed, those skilled in the art will recognize additional features and advantages upon reading the following detailed description, and upon viewing the accompanying drawings.

DETAILED DESCRIPTION

Figure 1:
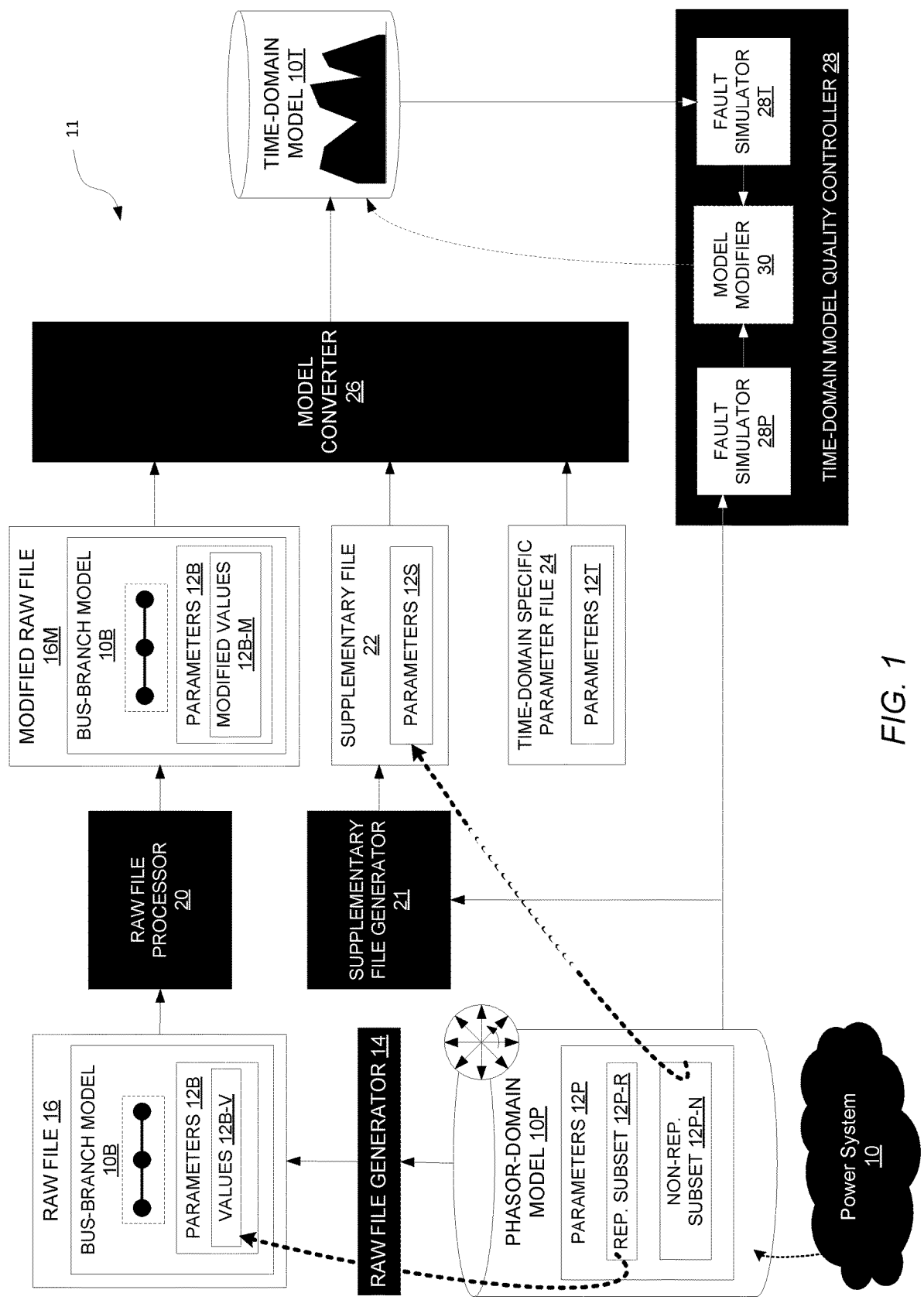
FIG. 1 is a block diagram of conversion equipment for converting a phasor-domain model of a power system to a time-domain model, according to some embodiments.

FIG. 1 shows a power system 10 according to some embodiments. The power system is a system of electrical components deployed to generate, transmit, and/or distribute electric power, e.g., for providing an electric utility. FIG. 1 also shows conversion equipment 11 for converting a phasor-domain model 10P of the power system 10 to a time-domain model 10T of the power system 10. Each of the models 10P, 10T may model the power system topology, the power system connectivity, and/or the electrical characteristics of equipment in the power 10 system 10. But the phasor-domain model 10P models the power system 10 in the phasor domain, whereas the time-domain model 10T models the power system 10 in the time domain. Accordingly, the phasor-domain model 10P models the power system 10 over a set of phasor values, where a phasor is a complex number (with real and imaginary parts) that represents the amplitude and phase of a sinusoid. By contrast, the time-domain model 10T models the power system 10 over a set of time values. By converting the phasor-domain model 10P to the time-domain model 10T, the conversion equipment 11 advantageously derives the time-domain model 10T from the phasor-domain model 10P so as to avoid having to develop the time-domain model 10T from scratch. The time-domain model 10T can then be used, e.g., by the same equipment or other equipment, to analyze the power system 10 in a way that accounts for electromagnetic transients, e.g., as needed in embodiments where the power system 10 includes inverter-based distributed energy resources (DERs).

Towards this end, the conversion equipment 11 as shown in FIG. 1 converts the phasor-domain model 10P to the time-domain model 10T by first generating a so-called raw file 16 from the phasor-domain model 10P, as an intermediate step in the conversion. In one embodiment, the raw file 16 contains data that is raw in the sense that the data indicates underlying characteristics of the power system 10, as opposed to data derived from power system analysis, e.g., data that enables power flow analysis as opposed to data indicating results of power flow analysis. The raw file 16 may for example describe the power system 10 in terms of data needed for power system calculations, such as load flow calculations, short circuit calculations, etc. The data in the raw file 16 may alternatively or additionally be raw in the sense that it is unprocessed, e.g., not processed by power system calculations such as load flow calculations. The data may thereby simply specify a model of the power system 10, e.g., to establish a case for power flow analysis.

The conversion equipment 11 as shown in FIG. 1 in this regard includes a raw file generator 14. The raw file generator 14 obtains the phasor-domain model 10P, such as by obtaining one or more digital files representing the phasor-domain model 10P, e.g., files with extensions .olr or .gdb. The raw file generator 14 then generates the raw file 16 from the phasor-domain model 10P. For example, in embodiments where the phasor-domain model 10P models the power system 10 in terms of certain parameters 12P, the raw file generator 14 may extract the values of at least a portion of those parameters 12P and use the extracted values (or derivatives thereof) as values in the raw file 16.

In some embodiments, for instance, the raw file 16 represents a bus-branch model 10B of the power system 10. Parameters 12B of such a bus-branch model 10B describe the power system 10 in terms of individual busbars interconnected via different branches, e.g., where the parameters 12B may include a bus voltage parameter indicating voltages levels of respective buses in the bus-branch model 10B. The raw file generator 14 in this case extracts the values of at least a portion of the parameters 12P of the phasor-domain model 10P, and uses the extracted values (or derivatives thereof) as the values 12B-V of the parameters 12B of the bus-branch model 10B.

Some embodiments herein nonetheless notably account for the inability of the raw file 16 to fully reflect the phasor-domain model 10P. Indeed, in some embodiments, only a subset 12P-R of the parameters 12P of the phasor-domain model 10P can be represented in the raw file 16. The structure, format, and/or parameters 12B of the raw file 16 may for example only support representing a subset 12P-R of the parameters 12P of the phasor-domain model 10P. Where the raw file 16 represents a bus-branch model 10B, for instance, the raw file 16 represents only a subset 12P-R of the parameters 12P of the phasor-domain model 10P as the parameters 12B of the bus-branch model 10B. This subset 12P-R is appropriately referred to as a representable subset 12P-R, because the parameters in the subset 12P-R are representable in the raw file 16. Other ones of the parameters 12P of the phasor-domain model 10P that cannot be represented in the raw file 16 are referred to as being included in a non-representable subset 12P-N. The non-representable subset 12P-N may for example include a mutual coupling parameter. Some embodiments herein account for the inability of the raw file 16 to represent the parameters in the non-representable subset 12P-N by supplementing the raw file 16 with a so-called supplementary file 22 that represents the non-representable subset 12P-N.

In more detail, FIG. 1 shows that the conversion equipment 11 includes a supplementary file generator 21. The supplementary file generator 21 obtains the phasor-domain model 10P, e.g., by obtaining one or more digital files representing the phasor-domain model 10P. The supplementary file generator 21 generates the supplementary file 22 from the phasor-domain model 10P. The supplementary file generator 21 may for example extract the values of parameters in the non-representable subset 12P-N of the phasor-domain model 10P and include the extracted values (or derivatives thereof) as the values of parameters 12S in the supplementary file 22, e.g., where the parameters 12S may for instance include a mutual coupling parameter. No matter the particular types of parameters 12S in the supplementary file 22, though, the raw file 16 and the supplementary file 22 collectively reflect the phasor-domain model 10P more fully than the raw file 16 alone.

Some embodiments herein also notably condition the raw file 16 in order to support more accurate conversion of the phasor-domain model 10P into the time-domain model 10T. This raw file conditioning effectively integrates a quality verification check into the conversion process, to address one potential source of conversion inaccuracy, in order to make intermediate conversion adjustments as needed to increase conversion accuracy.

The conversion equipment 11 as shown for example further includes a raw file processor 20. The raw file processor 20 modifies the raw file 16 as needed in order for the resulting modified raw file 16M to represent the representable subset 12P-R of parameters of the phasor-domain model 10P with at least a minimum level of accuracy, e.g., with at least 98% accuracy. The raw file processor 20 may for example modify the values 12B-V of at least some of the parameters 12B of the bus-branch model 10B in the raw file 16, resulting in a modified raw file 16M that has modified values 12B-M for at least some of the parameters 12B of the bus-branch model 10B. In some embodiments, the raw file processor 20 implements these modifications to the raw file 16 iteratively, over the course of multiple iterations, until the raw file 16 as modified represents the representable subset 12P-R of parameters of the phasor-domain model 10P with at least the minimum level of accuracy.

Figure 2:
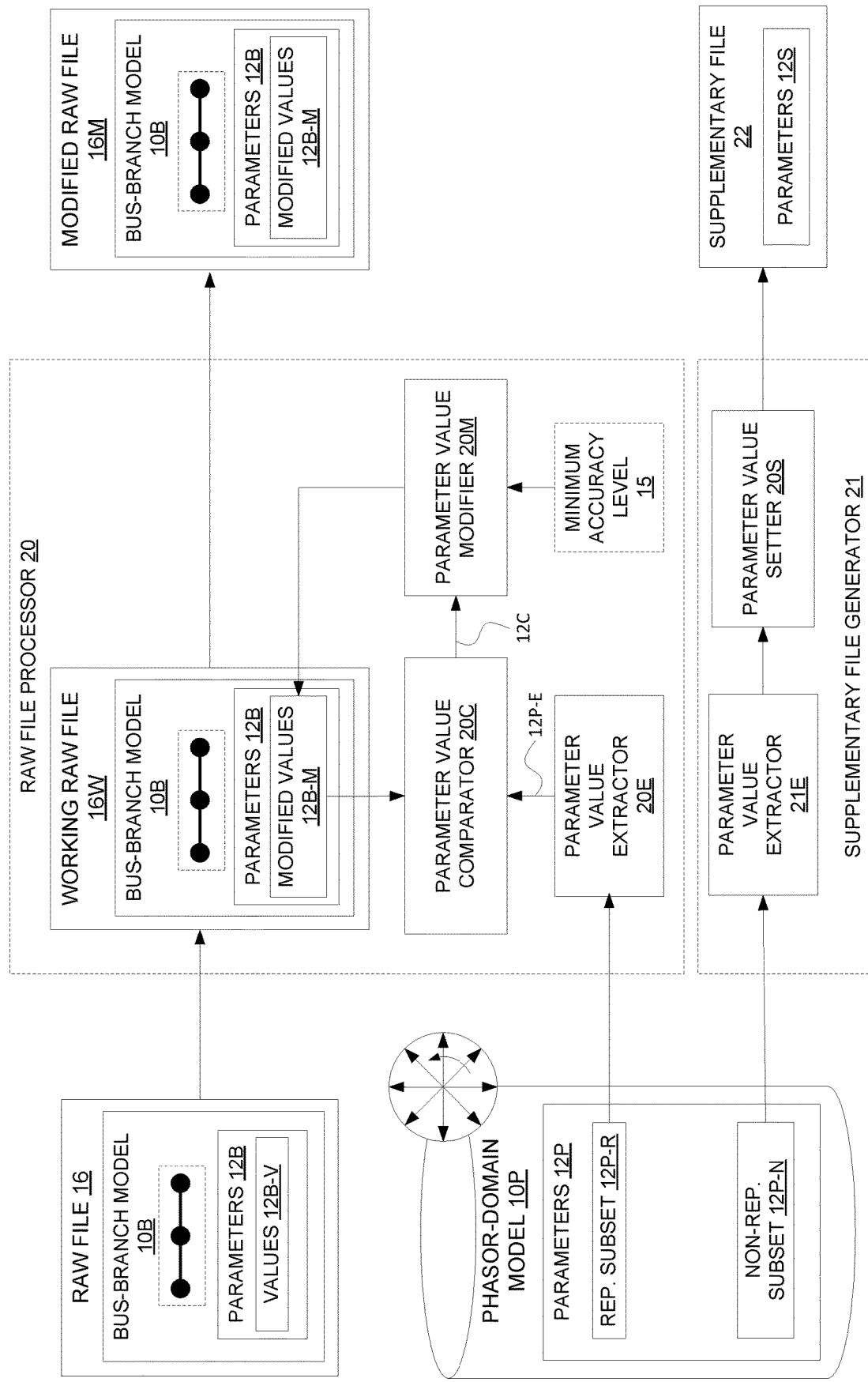
FIG. 2 is a block diagram of a raw file processor and supplementary file generator according to some embodiments.

FIG. 2 shows additional details of the raw file processor 20 according to some iterative modification embodiments in this regard, in conjunction with additional details of the supplementary file generator 21. As shown in FIG. 2, the raw file processor 20 receives the raw file 16 as input and designates the raw file 16 as the initial working raw file 16W. A parameter value extractor 20E of the raw file processor 20 extracts values of at least some of the parameters in the representable subset 12P-R, e.g., using rule-based Structured Query Language (SQL) queries. The parameter value extractor 20E provides the extracted values 12P-E to a parameter value comparator 20C, e.g., in the form of an extracted value report. The parameter value comparator 20C performs a comparison of the extracted values 12P-E with values 12B-M of respective parameters 12B in the bus-branch model 10B in the working raw file 16W. The parameter value comparator 20C provides the results 12C of this comparison to a parameter value modifier 20M. The parameter value modifier 20M modifies one or more values 12B-M of the respective parameters 12B in the bus-branch model 10B in the working raw file 16, as needed to reduce any discrepancy with the extracted values 12P-E according to the comparison 12C. The parameter value modifier 20M may for instance perform the modification by running rule-based SQL queries to fix potential discrepancies. The parameter value modifier 20M in some embodiments targets reducing discrepancies to realize at least a minimum accuracy level 15 for the modified raw file 16M.

In some embodiments, this comparison and modification is implemented on an individual parameter by parameter basis. In this case, for each of the parameters 12B of the bus-branch model 10B in the working raw file 16W, the parameter value modifier 20M modifies the value 12B-M of that parameter 12B to reduce any discrepancy between the value 12B-M of the parameter 12B and the corresponding value 12P-E extracted from the phasor-domain model 10P.

In these and other embodiments, the raw file processor 20 may perform the comparison and modification over the course of multiple iterations. Each iteration may for example incrementally improve the quality of the working raw file 16W by reducing one or more discrepancies, e.g., where each iteration encompasses modifications to multiple parameters, each iteration may reduce a metric reflecting the total discrepancy across those parameters. For instance, if there is error in the network element impedance values, the iteration process can reduce the error. Once the working raw file 16W achieves at least the minimum accuracy level 15, the iterative raw file modification process ends and the working raw file 16W is outputted as the modified raw file 16M.

Whereas raw file modification as described above operates on the representable subset 12P-R of parameters of the phasor-domain model 10P, FIG. 2 shows that the supplementary file generator 21 operates on the non-representable subset 12P-N of parameters of the phasor-domain model 10P, e.g., to capture data missing from the raw file 16 due to the inability of the raw file 16 to represent that data. In particular, the supplementary file generator 21 as shown includes a parameter value extractor 12E that extracts values of parameters in the non-representable subset 12P-N from the phasor-domain model 10P. The parameter value extractor 12E may for example execute a preconfigured set of rule-based SQL queries to extract values of a preconfigured set of parameters that the raw file 16 is incapable of representing. A parameter value setter 20S then sets values of corresponding parameters 12S in the supplementary file 22 based on the values extracted by the parameter value extractor 12E.

Returning back to FIG. 1, the conversion equipment 11 as described so far produces a supplementary file 22 and a modified raw file 16W that collectively represent the phasor-domain model 10P. The conversion equipment 11 notably also obtains a time-domain specific parameter file 24 that represents parameters 12T specific for modeling the power system 10 in the time-domain. Because the parameters 12T are specific for modeling the power system 10 in the time-domain, they are not represented in the phasor-domain model 10P. These time-domain specific parameters 12T may for example include transformer saturation parameters, transient parameters, frequency-dependent line parameters, and/or other parameters that are inapplicable to phasor-domain modeling.

The modified raw file 16M, the supplementary file 22, and the time-domain specific parameter file 24 equip the conversion equipment 11 to generate the time-domain model 10T from the phasor-domain model 10P. The conversion equipment 11 in this regard further includes a model converter 26 as shown in FIG. 1. The model converter 26 converts the phasor-domain model 10P to the time-domain model 10T based on the modified raw file 16M, the supplementary file 22, and the time-domain specific parameter file 24. For example, the model converter 26 may convert the modified raw file 16M to a working version of the time-domain model 10T. The working version of the time-domain model 10T at this stage may lack values for one or more parameters, such that the working version is incomplete. The model converter 26 may then fill in missing values for those parameters using the values of parameters 12S in the supplementary file 22 and using the values of parameters 12T in the time-domain specific parameter file 24. This may yield a working version of the time-domain model 10T that is complete.

Though the working version of the time-domain model 10T is complete at this stage, in the sense that it does not lack values for parameters, the conversion equipment 11 according to some embodiments nonetheless integrates another quality verification check into the conversion process. This quality verification check notably exploits availability of the phasor-domain model 10P in order to check the end-to-end quality of the working version of the time-domain model 10T, and make adjustments as needed to increase conversion accuracy. FIG. 1 in particular shows that the conversion equipment 11 in some embodiments includes a time-domain model quality controller 28 for this purpose. The time-domain model quality controller 28 exploits access to the phasor-domain model 10P in order to check how accurately the time-domain model 10T reflects the phasor-domain model 10P, and makes adjustments to the time-domain model 10T as needed to improve that accuracy.

In some embodiments, the time-domain model quality controller 28 checks the quality of the time-domain model 10T using one or more simulations, in order to check how similar results of the simulation(s) on the time-domain model 10T are to results of the same simulation(s) on the phasor-domain model 10P. The more similar results of the simulation(s) on the time-domain model 10T are to results of the same simulation(s) on the phasor-domain model 10P, the more accurate the time-domain model 10T and the higher quality the time-domain model 10T.

Figure 3:
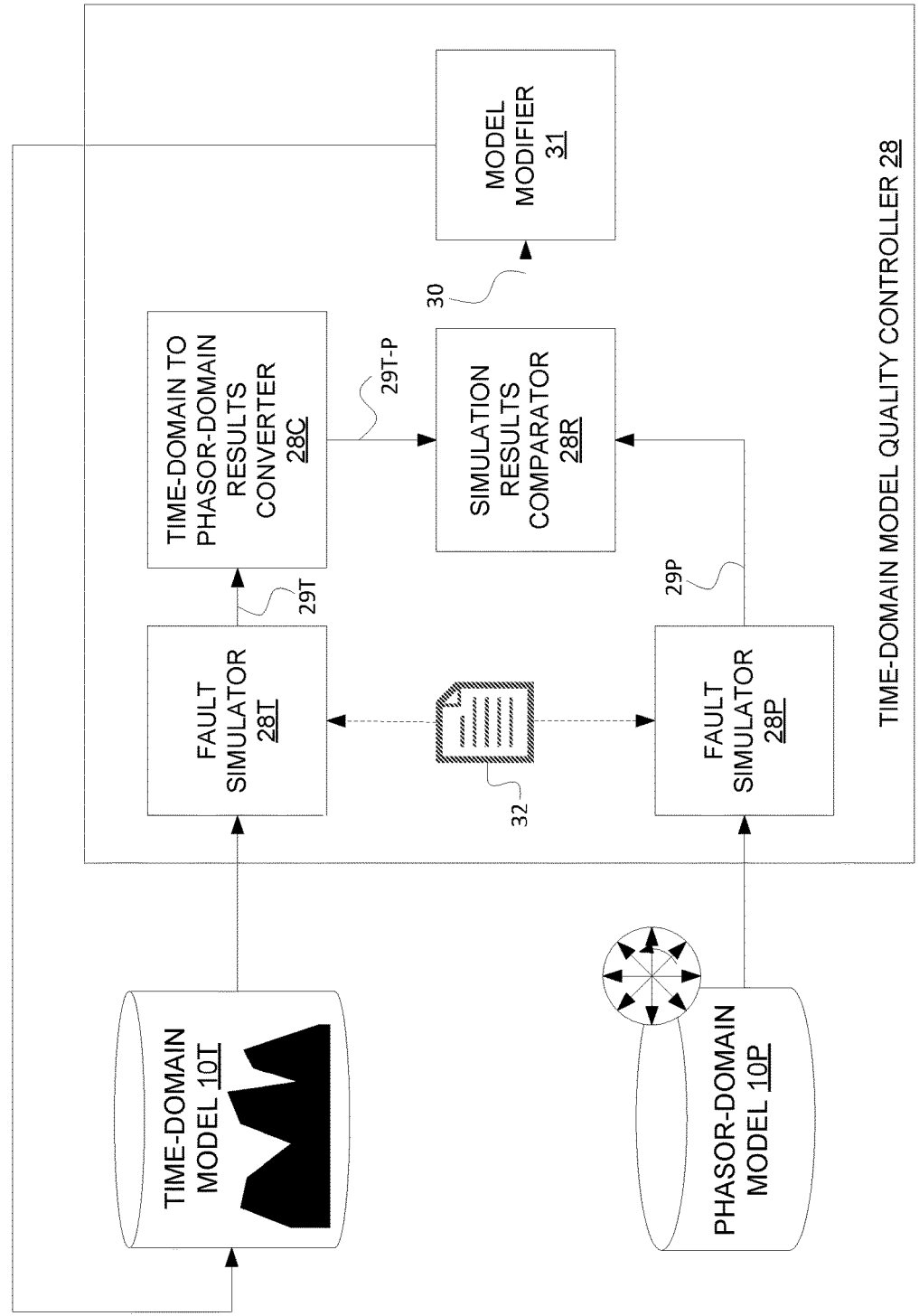
FIG. 3 is a block diagram of a time-domain model quality controller according to some embodiments.

FIG. 1 as an example shows that the time-domain model quality controller 28 checks the quality of the time-domain model 10T using one or more faults simulations in some embodiments. In this case, the time-domain model quality controller 28 performs fault simulation-based quality verification of the time-domain model 10T. The time-domain model quality controller 28 includes a fault simulator 28P that performs a simulation of one or more faults in the power system 10 as modeled with the phasor-domain model 10P, and a fault simulator 28T that performs a simulation of the same one or more faults in the power system 10 as modeled with the time-domain model 10T. The fault(s) simulated may for example include single-line and three-phase faults at system buses in the power system 10. Regardless, the time-domain model quality controller 28 also includes a model modifier 30 that compares results of the fault simulations and modifies the working version of the time-domain model 10T based on that comparison. The time-domain model quality controller 28 in particular adjusts the working version of the time-domain model 10T to reduce discrepancy between the time-domain model 10T and the phasor-domain model 10*p* in terms of the power system's response to faults. FIG. 3 for example illustrates additional details of fault simulation-based quality verification according to some embodiments.

As shown in FIG. 3, fault simulator 28P performs one or more phasor-domain simulations of faults in the power system 10 as modeled with the phasor-domain model 12P and provides phasor-domain results 29P of the one or more phasor-domain simulations to a simulation results comparator 28R. Likewise, fault simulator 28T performs one or more time-domain simulations of faults in the power system 10 as modeled with the time-domain model 10T. Rather than providing time-domain results 29T of the one or more time-domain simulations directly to the simulation results comparator 28R, though, fault simulator 28T instead provides the time-domain results 29T to a time-domain to phasor-domain results converter 28C. This converter 28C converts the time-domain results 29T into the phasor-domain in order to obtain phasor-domain results 29T-P of the time-domain simulation(s). These phasor-domain results 29T-P are then provided to the simulation results comparator 28R. With the phasor-domain results 29T-P of the time-domain simulation(s) and the phasor-domain results 29P of the phasor-domain simulation(s) in a common domain (the phasor domain), the simulation results comparator 28R performs a comparison of the results 29T-P, 29P. The simulation results comparator 28R provides results 30 of the comparison to a model modifier 31. The model modifier 31 modifies the working version of the time-domain model 10T as needed to reduce discrepancy between the simulation result(s) 29T-P, 29P.

In some embodiments, this fault simulation-based quality verification of the time-domain model 10T is performed in each of multiple iterations, e.g., to incrementally improve conversion quality with each iteration. In this case, the time-domain model quality controller 28 modifies the working version of the time-domain model 10T in between each iteration. This modification is performed as needed to reduce discrepancy between the results of fault simulation in the power system 10 as modeled with the phasor-domain model 10P and results of fault simulation in the power system 10 as modeled with the time-domain model 10T.

Although exemplified in FIG. 3 as performing simulation results comparison in the phasor-domain, the simulation results comparison may alternatively be performed in the time-domain. In other embodiments not shown, for example, the phasor-domain simulation results 29P are converted to the time-domain, and the simulation results comparator 28R compares the time-domain results of the phasor-domain simulation(s) to the time-domain results 29T of the time-domain simulation(s), for driving time-domain model modifications. Whether the time-domain or the phasor-domain, therefore, the time-domain model quality controller 28 converts the results of at least one of the simulations in order to perform the comparison in a domain that is common to them.

Figure 4:
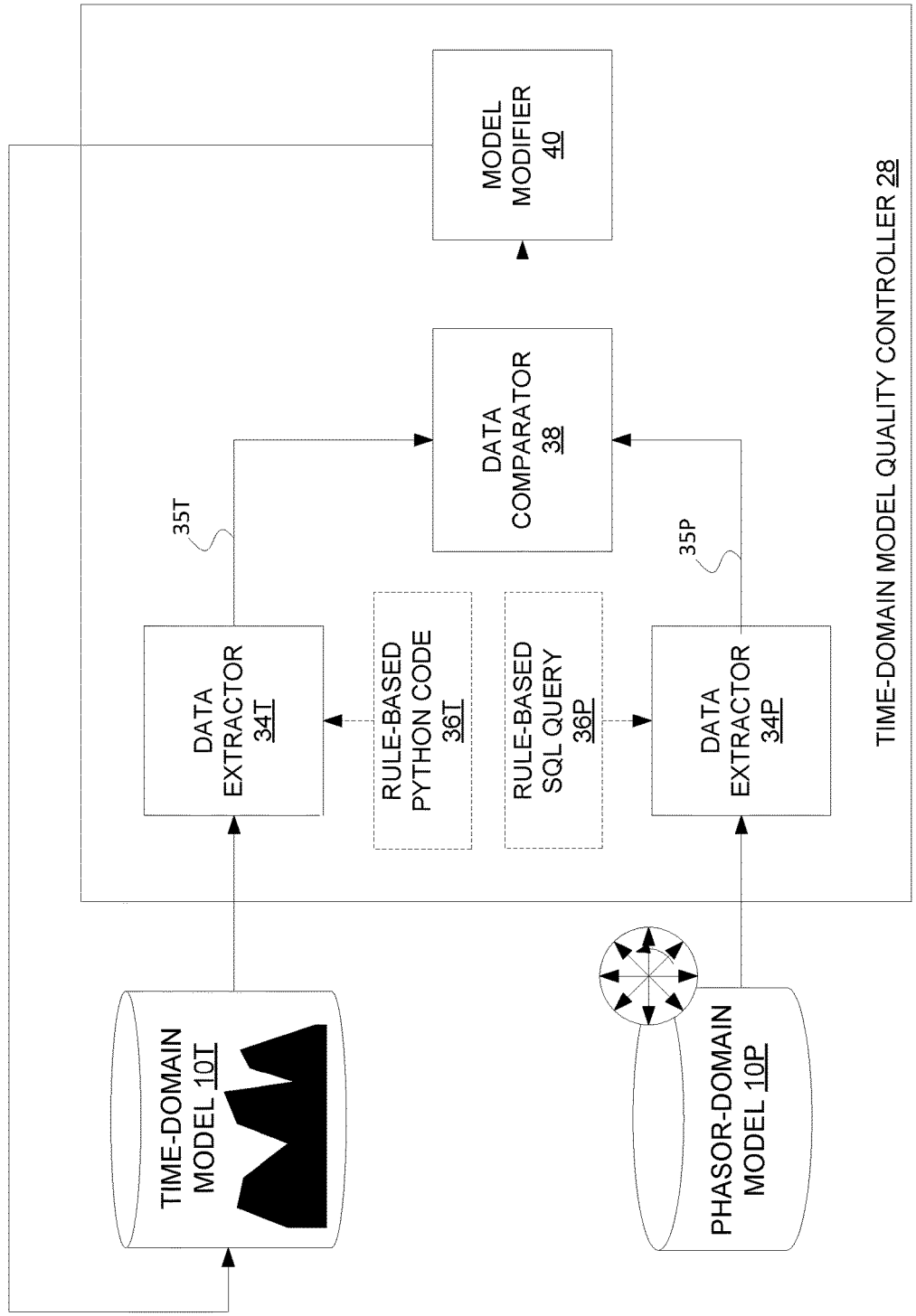
FIG. 4 is a block diagram of a time-domain model quality controller according to other embodiments.

Alternatively or additionally to performing simulation-based quality verification of the time-domain model 10T, the time-domain model quality controller 28 in other embodiments may perform data-based quality verification of the time-domain model 10T. Data-based quality verification verifies the quality of the time-domain model 10T by verifying that the data in the time-domain model 10T accurately reflects the data in the phasor-domain model 10P. FIG. 4 shows additional details of data-based quality verification according to some embodiments.

As shown in FIG. 4, the time-domain model quality controller 28 in some embodiments includes a data extractor 34P that extracts data 35P from the phasor-domain model 10P, e.g., using one or more rule-based SQL queries 36P or some other rule-based algorithm or code. The time-domain model quality controller 28 also includes a data extractor 34T that extracts data 35T from the time-domain model 10T, e.g., using rule-based Python code 36T or some other rule-based algorithm or code. In some embodiments, the data 35P extracted from the phasor-domain model 10P and the data 35T extracted from the time-domain model 10T includes data of the same type(s). For example, the data 35P extracted from the phasor-domain model 10P and the data 35T extracted from the time-domain model 10T may each include line parameters (e.g., zero, positive, and/or negative sequence values), generator parameters (e.g., zero, positive, and/or negative sequence values, ratings, and/or voltage levels), and/or shunt equipment parameters (e.g., zero, positive, and/or negative sequence values).

The time-domain model quality controller 28 as shown also includes a data comparator 38. The data comparator 38 compares the data 35P extracted from the phasor-domain model 10P to the data 35T extracted from the time-domain model 10T. Depending on the results of the comparison, a model modifier 40 may modify the time-domain model 10T as needed to reduce any discrepancy between the extracted data 35T, 35P.

In some embodiments, this data-based quality verification of the time-domain model 10T is performed in each of multiple iterations, e.g., to incrementally improve conversion quality with each iteration. In this case, the time-domain model quality controller 28 modifies the working version of the time-domain model 10T in between each iteration. This modification is performed as needed to reduce discrepancy between the data 35P extracted from the phasor-domain model 10P to the data 35T extracted from the time-domain model 10T.

By integrating quality verification into the conversion process at multiple points in the conversion process, e.g., at generation of the raw file and at generation of the initial version of the time-domain model, some embodiments herein advantageously provide accurate conversion of a phasor-domain model of a power system to a corresponding time-domain model. This in turn facilitates power system analysis, even for power systems that include a meaningful number of inverter-based DERs, without requiring designers and/or operators to develop the time-domain model 10P from scratch and/or without jeopardizing the accuracy gains realizable from time-domain modeling.

No matter whether quality verification is simulation-based and/or data-based, the conversion equipment 11 in some embodiments modifies the time-domain model 10T to improve the quality of the time-domain model 10T. In one or more embodiments, though, modification to the time-domain model 10T may be subject to the direction and/or approval of a user of the conversion equipment 11 (e.g., the designer and/or operator). For example, in some embodiments, the conversion equipment 11 produces a log or report that indicates any discrepancy between the phasor-domain model 10P and the time-domain model 10T and/or that indicates proposed modifications to the time-domain model 10T to reduce such discrepancy. In this case, the conversion equipment 11 may wait for the direction or approval of the user before modifying the time-domain model 10T, e.g., after the user has reviewed the log or report and confirmed that modification of the time-domain model 10T is desirable. The same sort of log or report, coupled with user direction or approval, may drive intermediate quality verification and modification of the raw file 16. Some embodiments thereby enable largely automated phasor to time domain model conversion, with little to no manual intervention required.

In these and other embodiments, then, the conversion equipment 11 herein may prove especially advantageous if an existing phasor-domain model 10P of the power system 10 is already in place, since the time-domain model 10T can be derived from this existing phasor-domain model 10P with little manual effort. The conversion equipment 11 may for example advantageously help transmission and distribution utilities to have their existing power system model in the phasor-domain converted to the time domain, so that they can conduct new and detailed transient studies. Moreover, the automated quality assurance mechanisms help ensure that the model in the time-domain environment is a good replication of the phasor-domain model 10P.

Note that the conversion equipment 11 herein in some embodiments includes native raw file generation, such that the raw file generator 14 in FIG. 1 is implemented by the conversion equipment 11. In other embodiments, though, the conversion equipment 11 exploits a raw file 16 generated by other equipment, in which case the conversion equipment 11 may not implemented the raw file generator 14 in FIG. 1. In this case, then, the raw file processor 20 of the conversion equipment 11 receives the raw file 16 as input, where the raw file 16 was generated by other equipment external to the conversion equipment 11.

Figure 5:
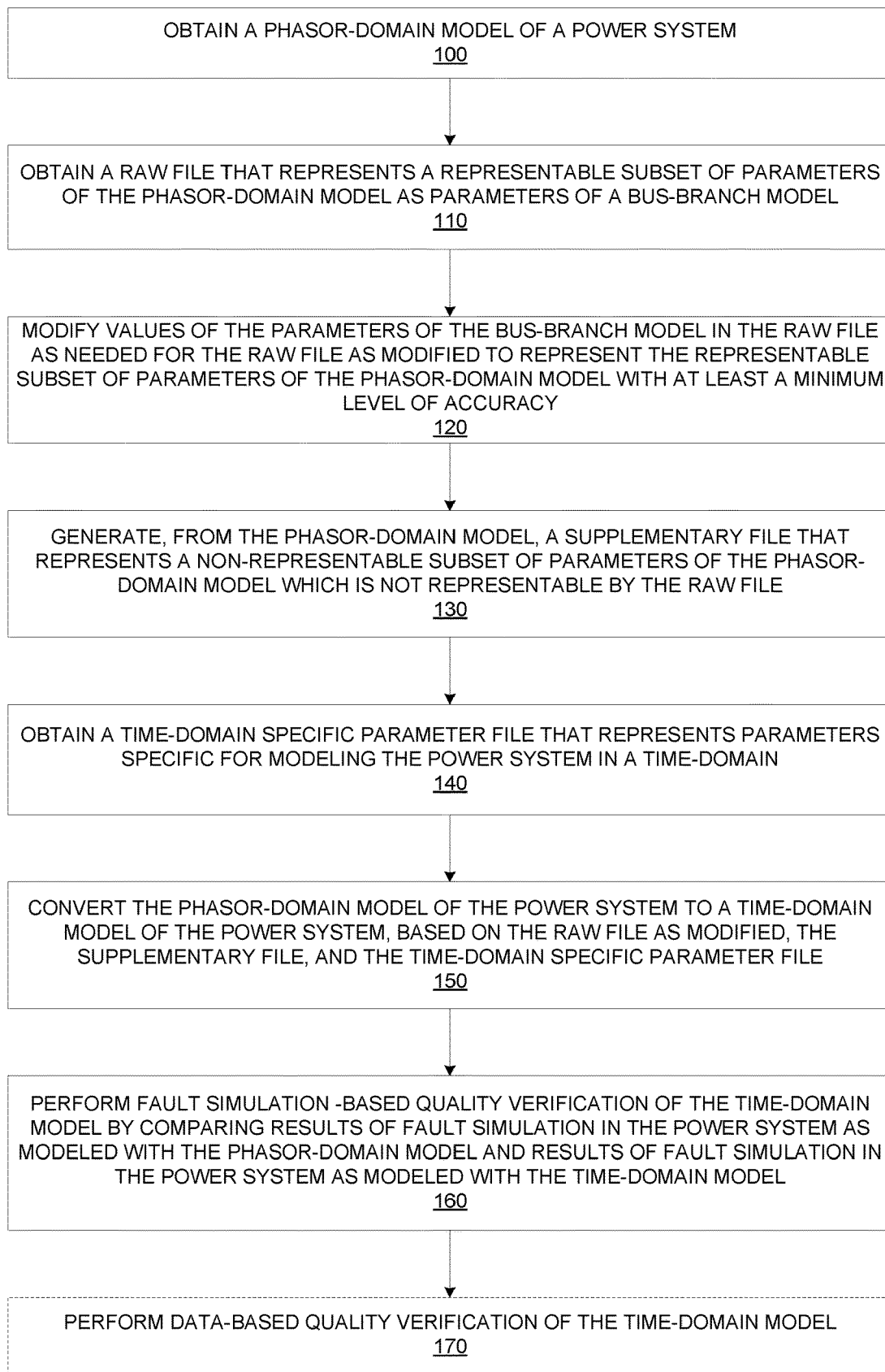
FIG. 5 is a logic flow diagram of a method performed by conversion equipment according to some embodiments.

Generally, though, FIG. 5 illustrates a method for power system model conversion and quality verification according to some embodiments, e.g., as described above with respect to FIGS. 1-4. As shown in FIG. 5, the method comprises obtaining a phasor-domain model 10P of a power system 10 (Block 100). The method also comprises obtaining a raw file 16 that represents a representable subset 12P-R of parameters 12P of the phasor-domain model 10P as parameters 12B of a bus-branch model 10B (Block 110). The method also comprises modifying values 12B-V of the parameters 12B of the bus-branch model 10B in the raw file 16 as needed for the raw file 16M as modified to represent the representable subset 12P-R of parameters 12P of the phasor-domain model 10P with at least a minimum level 15 of accuracy (Block 120).

The method further comprises generating, from the phasor-domain model 10P, a supplementary file 22 that represents a non-representable subset 12P-N of parameters 12P of the phasor-domain model 10P which is not representable by the raw file 16 (Block 130).

The method also comprises obtaining a time-domain specific parameter file 24 that represents parameters 12T specific for modeling the power system 10 in a time-domain (Block 140).

The method further comprises converting the phasor-domain model 10P of the power system 10 to a time-domain model 10T of the power system 10, based on the raw file 16M as modified, the supplementary file 22, and the time-domain specific parameter file 24 (Block 150).

In some embodiments, the method also comprises performing fault simulation-based quality verification of the time-domain model 10T by comparing results 29P of fault simulation in the power system 10 as modeled with the phasor-domain model 10P and results 29T of fault simulation in the power system 10 as modeled with the time-domain model 10T (Block 160).

In one or more embodiments, the method alternatively or additionally comprises performing data-based quality verification of the time-domain model 10T (Block 170).

Embodiments herein also include the conversion equipment 11 as configured to perform the method shown in FIG. 5.

Figure 6:
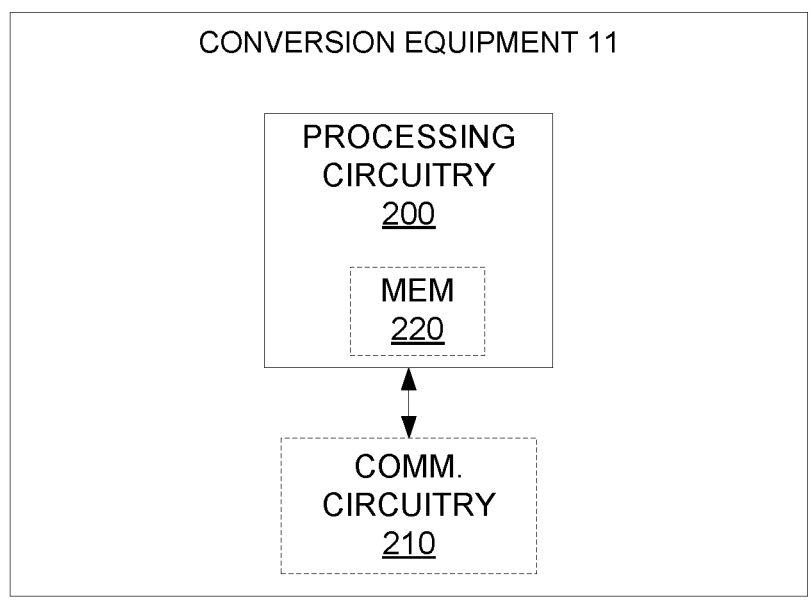
FIG. 6 is a block diagram of conversion equipment according to some embodiments.

FIG. 6 for example shows additional details of the conversion equipment 11 according to some embodiments. As shown, the conversion equipment 11 includes processing circuitry 200. The processing circuitry 200 is configured to implement the raw file processor 20, the supplementary file generator 21, the model converter 26, and the time-domain model quality controller 28 as described in FIG. 1, e.g., according to the method in FIG. 5. In some embodiments, the processing circuitry 200 is also configured to implement the raw file generator 14 in FIG. 1. In either case, the processing circuitry 200 may comprise circuitry dedicated to operating as described and/or may include circuitry configured to execute program code stored in memory 220.

In some embodiments, the conversion equipment 11 also includes communication circuitry 210 configured to receive one or more files input to the conversion equipment 11, e.g., for receiving a raw file 16 and/or a time-domain specific parameter file 24. The communication circuitry 210 in this case may implement one or more communication interfaces appropriate for receiving files of a type or format defined by the raw file 16 and/or the time-domain specific parameter file 24.

Generally, then, the conversion equipment 11 may comprise respective circuits or circuitry configured to perform the method in FIG. 5. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The circuits or circuitry may be configured to execute program code stored in memory, which may include one or several types of memory such as read-only memory (ROM), random-access memory, cache memory, flash memory devices, optical storage devices, etc. Program code stored in memory may include program instructions for carrying out one or more of the techniques described herein, in several embodiments. In embodiments that employ memory, the memory stores program code that, when executed by the one or more processors, carries out the techniques described herein.

Those skilled in the art will also appreciate that embodiments herein further include corresponding computer programs.

A computer program comprises instructions which, when executed on at least one processor of a computer, cause the computer to carry out any of the respective processing described above. A computer program in this regard may comprise one or more code modules corresponding to the means or units described above. The computer may thereby be configured by the computer program to operate as conversion equipment 11 herein.

Embodiments further include a carrier containing such a computer program. This carrier may comprise one of an electronic signal, optical signal, radio signal, or a non-transitory computer-readable storage medium.

In this regard, embodiments herein also include a non-transitory computer-readable storage medium on which is stored a computer program that, when executed by a processor of a computer, cause the computer to perform as described above. The computer may thereby be configured by the computer program to operate as conversion equipment 11 herein.

Those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method for power system model conversion and quality verification, the method comprising:
   obtaining a phasor-domain model of a power system;
   obtaining a raw file that represents a representable subset of parameters of the phasor-domain model as parameters of a bus-branch model;
   modifying values of the parameters of the bus-branch model in the raw file as needed for the raw file as modified to represent the representable subset of parameters of the phasor-domain model with at least a minimum level of accuracy;
   generating, from the phasor-domain model, a supplementary file that represents a non-representable subset of parameters of the phasor-domain model which is not representable by the raw file;
   obtaining a time-domain specific parameter file that represents parameters specific for modeling the power system in a time-domain;

converting the phasor-domain model of the power system to a time-domain model of the power system, based on the raw file as modified, the supplementary file, and the time-domain specific parameter file; and performing fault simulation-based quality verification of the time-domain model by:
  comparing results of fault simulation in the power system as modeled with the phasor-domain model and results of fault simulation in the power system as modeled with the time-domain model; and
  based on said comparing, modifying the time-domain model as needed to reduce discrepancy between the results of fault simulation in the power system as modeled with the phasor-domain model and results of fault simulation in the power system as modeled with the time-domain model.

2. The method of claim 1, wherein said modifying comprises, for each of one or more iterations:
  extracting, from the phasor-domain model, values of at least some parameters in the representable subset;
  performing a comparison of the extracted values with values of respective parameters in the bus-branch model in the raw file; and
  modifying one or more values of the respective parameters in the bus-branch model in the raw file, as needed to reduce any discrepancy with the extracted parameters according to the comparison.

3. The method of claim 2, wherein said extracting and/or said modifying is performed by running rule-based Structured Query Language (SQL) queries on the phasor-domain model.

4. The method of claim 1, wherein performing fault simulation-based quality verification of the time-domain model comprises:
  performing one or more phasor-domain simulations of faults in the power system as modeled with the phasor-domain model and obtaining phasor-domain results of the one or more phasor-domain simulations;
  performing one or more time-domain simulations of faults in the power system as modeled with the time-domain model and obtaining time-domain results of the one or more time-domain simulations;
  converting the time-domain results into the phasor-domain, or converting the phasor-domain results into the time-domain, to obtain results of the one or more phasor-domain simulations and results of the one or more time-domain simulations in a common domain; and
  comparing results of the one or more phasor-domain simulations and results of the one or more time-domain simulations in the common domain.

5. The method of claim 1, wherein performing the fault simulation-based quality verification of the time-domain model comprises performing the fault simulation-based quality verification of the time-domain model in each of multiple iterations, modifying the time-domain model in between the iterations as needed to reduce discrepancy between the results of fault simulation in the power system as modeled with the phasor-domain model and results of fault simulation in the power system as modeled with the time-domain model.

6. The method of claim 1, further comprising performing data-based quality verification of the time-domain model by:
  extracting data of the same type from each of the time-domain model and the phasor-domain model; and
  comparing the data extracted from the time-domain model to the data extracted from the phasor-domain model.

7. The method of claim 6, wherein the extracted data includes one or more of:
  line parameters including zero, positive, and/or negative sequence values;
  generator parameters including zero, positive, and/or negative sequence values, ratings, and/or voltage levels; or
  shunt equipment parameters including zero, positive, and/or negative sequence values.

8. The method of claim 6, wherein performing the data-based quality verification of the time-domain model comprises performing the data-based quality verification of the time-domain model in each of multiple iterations, modifying the time-domain model in between the iterations as needed to reduce discrepancy between the data extracted from the time-domain model and the data extracted from the phasor-domain model.

9. The method of claim 1, wherein the parameters of the bus-branch model include a bus voltage parameter indicating voltage levels of respective buses in the bus-branch model, wherein parameters specific for modeling the power system in a time-domain include transformer saturation parameters, transient parameters, and/or frequency-dependent line parameters, and wherein the non-representable subset of parameters includes a mutual coupling parameter.

10. The method of claim 1, further comprising analyzing the power system, accounting for electromagnetic transients, using the time-domain model.

11. A non-transitory computer-readable medium on which is stored a computer program that, when executed by processing circuitry of a computer, causes the computer to:
  obtain a phasor-domain model of a power system;
  obtain a raw file that represents a representable subset of parameters of the phasor-domain model as parameters of a bus-branch model;
  modify values of the parameters of the bus-branch model in the raw file as needed for the raw file as modified to represent the representable subset of parameters of the phasor-domain model with at least a minimum level of accuracy;
  generate, from the phasor-domain model, a supplementary file that represents a non-representable subset of parameters of the phasor-domain model which is not representable by the raw file;
  obtain a time-domain specific parameter file that represents parameters specific for modeling the power system in a time-domain;
  convert the phasor-domain model of the power system to a time-domain model of the power system, based on the raw file as modified, the supplementary file, and the time-domain specific parameter file; and
  perform fault simulation-based quality verification of the time-domain model by:
    comparing results of fault simulation in the power system as modeled with the phasor-domain model and results of fault simulation in the power system as modeled with the time-domain model; and
    modifying the time-domain model as needed to reduce discrepancy between the results of fault simulation in the power system as modeled with the phasor-domain model and results of fault simulation in the power system as modeled with the time-domain model.

12. The non-transitory computer-readable medium of claim 11, wherein the computer program, when executed by the processing circuitry of the computer, causes the computer to modify values of the parameters of the bus-branch model in the raw file by, for each of one or more iterations:

extracting, from the phasor-domain model, values of at least some parameters in the representable subset;

performing a comparison of the extracted values with values of respective parameters in the bus-branch model in the raw file; and modifying one or more values of the respective parameters in the bus-branch model in the raw file, as needed to reduce any discrepancy with the extracted parameters according to the comparison.

13. The non-transitory computer-readable medium of claim 12, wherein the computer program, when executed by the processing circuitry of the computer, causes the computer to perform said extracting and/or said modifying by running rule-based Structured Query Language (SQL) queries on the phasor-domain model.

14. The non-transitory computer-readable medium of claim 11, wherein the computer program, when executed by the processing circuitry of the computer, causes the computer to perform fault simulation-based quality verification of the time-domain model by:

performing one or more phasor-domain simulations of faults in the power system as modeled with the phasor-domain model and obtaining phasor-domain results of the one or more phasor-domain simulations;

performing one or more time-domain simulations of faults in the power system as modeled with the time-domain model and obtaining time-domain results of the one or more time-domain simulations;

converting the time-domain results into the phasor-domain, or converting the phasor-domain results into the time-domain, to obtain results of the one or more phasor-domain simulations and results of the one or more time-domain simulations in a common domain; and comparing results of the one or more phasor-domain simulations and results of the one or more time-domain simulations in the common domain.

15. The non-transitory computer-readable medium of claim 11, wherein the computer program, when executed by the processing circuitry of the computer, causes the computer to perform the fault simulation-based quality verification of the time-domain model by performing the fault simulation-based quality verification of the time-domain model in each of multiple iterations, modifying the time-domain model in between the iterations as needed to reduce discrepancy between the results of fault simulation in the power system as modeled with the phasor-domain model and results of fault simulation in the power system as modeled with the time-domain model.

16. The non-transitory computer-readable medium of claim 11, wherein the computer program, when executed by the processing circuitry of the computer, further causes the computer to perform data-based quality verification of the time-domain model by:

extracting data of the same type from each of the time-domain model and the phasor-domain model; and comparing the data extracted from the time-domain model to the data extracted from the phasor-domain model.

17. The non-transitory computer-readable medium of claim 16, wherein the extracted data includes one or more of:

line parameters including zero, positive, and/or negative sequence values;

generator parameters including zero, positive, and/or negative sequence values, ratings, and/or voltage levels; or shunt equipment parameters including zero, positive, and/or negative sequence values.

18. The non-transitory computer-readable medium of claim 16, wherein the computer program, when executed by the processing circuitry of the computer, causes the computer to perform the data-based quality verification of the time-domain model by performing the data-based quality verification of the time-domain model in each of multiple iterations, modifying the time-domain model in between the iterations as needed to reduce discrepancy between the data extracted from the time-domain model and the data extracted from the phasor-domain model.

19. The non-transitory computer-readable medium of claim 11, wherein the parameters of the bus-branch model include a bus voltage parameter indicating voltage levels of respective buses in the bus-branch model, wherein parameters specific for modeling the power system in a time-domain include transformer saturation parameters, transient parameters, and/or frequency-dependent line parameters, and wherein the non-representable subset of parameters includes a mutual coupling parameter.

20. Conversion equipment comprising processing circuitry configured to:

obtain a phasor-domain model of a power system;

obtain a raw file that represents a representable subset of parameters of the phasor-domain model as parameters of a bus-branch model;

modify values of the parameters of the bus-branch model in the raw file as needed for the raw file as modified to represent the representable subset of parameters of the phasor-domain model with at least a minimum level of accuracy;

generate, from the phasor-domain model, a supplementary file that represents a non-representable subset of parameters of the phasor-domain model which is not representable by the raw file;

obtain a time-domain specific parameter file that represents parameters specific for modeling the power system in a time-domain;

convert the phasor-domain model of the power system to a time-domain model of the power system, based on the raw file as modified, the supplementary file, and the time-domain specific parameter file; and perform fault simulation-based quality verification of the time-domain model by:

comparing results of fault simulation in the power system as modeled with the phasor-domain model and results of fault simulation in the power system as modeled with the time-domain model; and modifying the time-domain model as needed to reduce discrepancy between the results of fault simulation in the power system as modeled with the phasor-domain model and results of fault simulation in the power system as modeled with the time-domain model.

21. The non-transitory computer-readable medium of claim 11, wherein the computer program, when executed by processing circuitry of a computer, further causes the computer to analyze the power system, accounting for electromagnetic transients, using the time-domain model.

* * * * *